(No Model.) 2 Sheets—Sheet 1.
W. S. JOHNSON.
WATER HEATING APPARATUS.
No. 434,111. Patented Aug. 12, 1890.
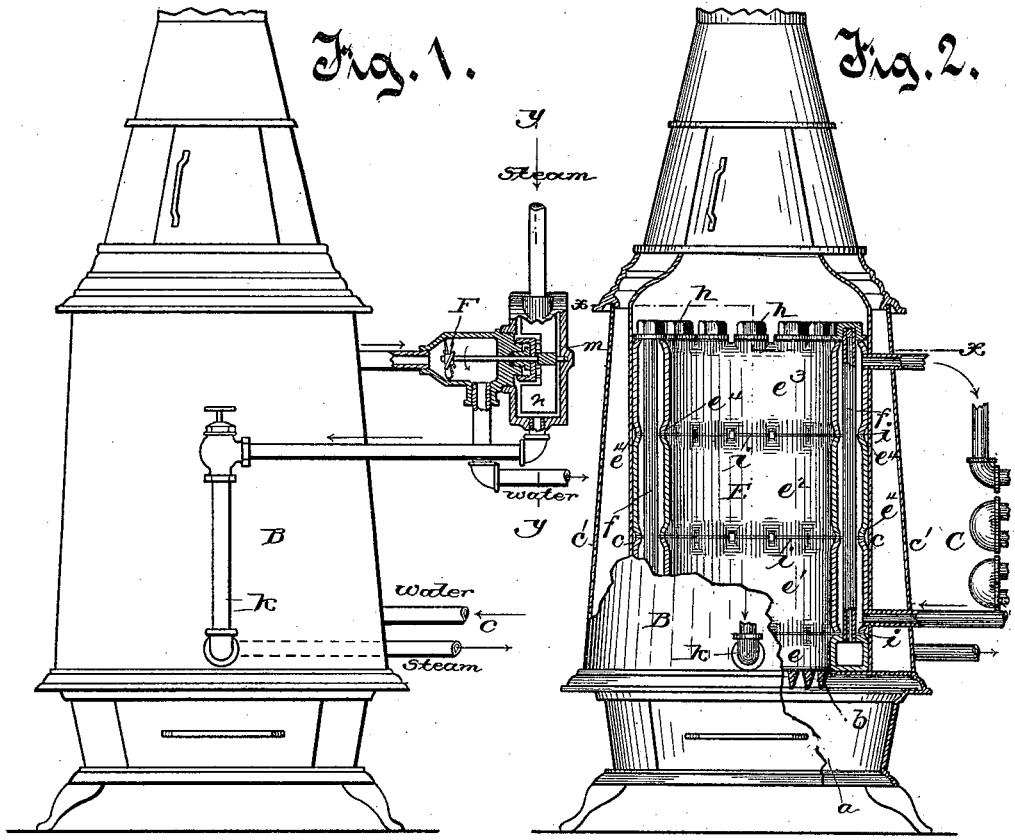
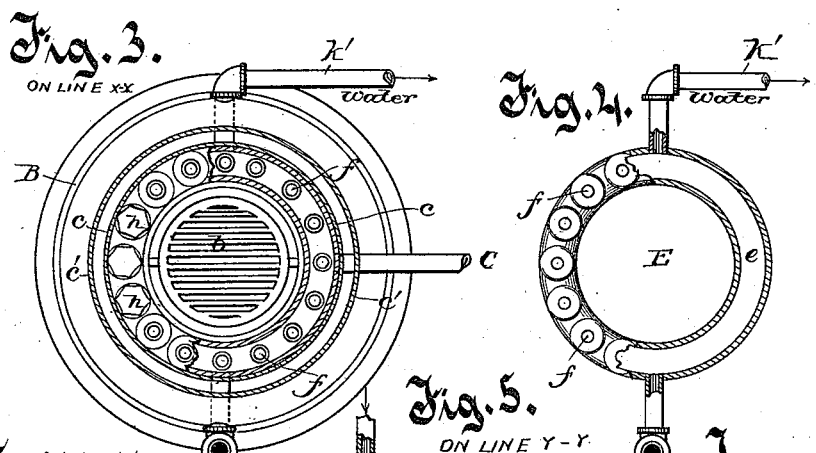
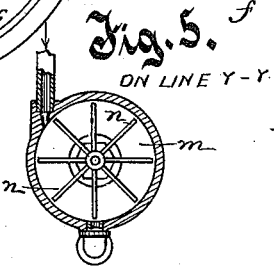
Witnesses.
W. A. Kennedy
Stanley Elmore
Inventor.
W. S. Johnson
By Phil. T. Dodge
Attorney.

(No Model.) 2 Sheets—Sheet 2.
W. S. JOHNSON.
WATER HEATING APPARATUS.
No. 434,111. Patented Aug. 12, 1890.
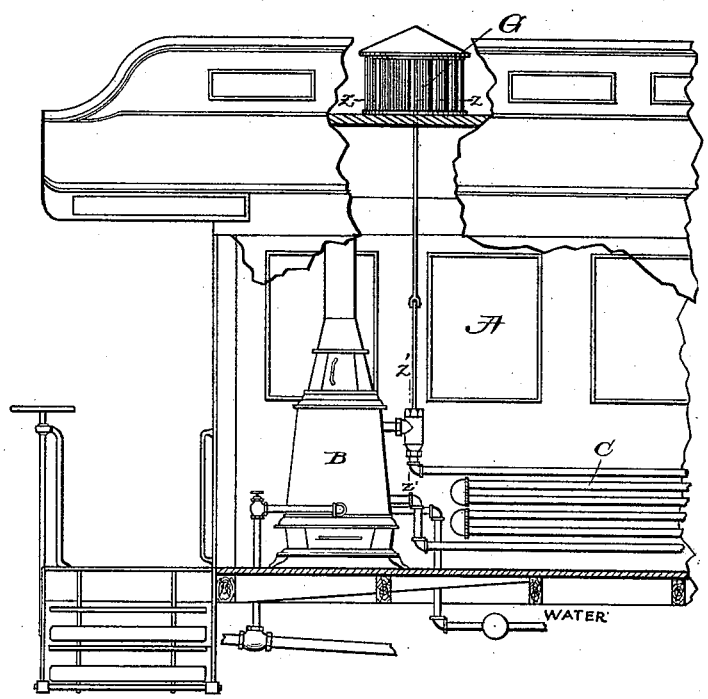
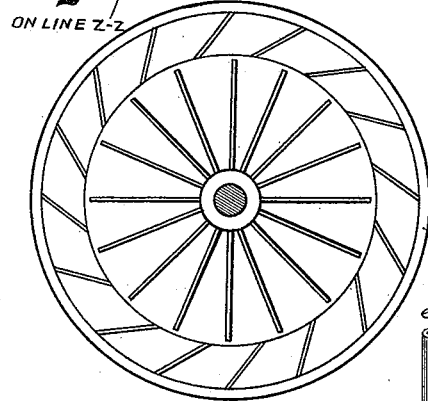
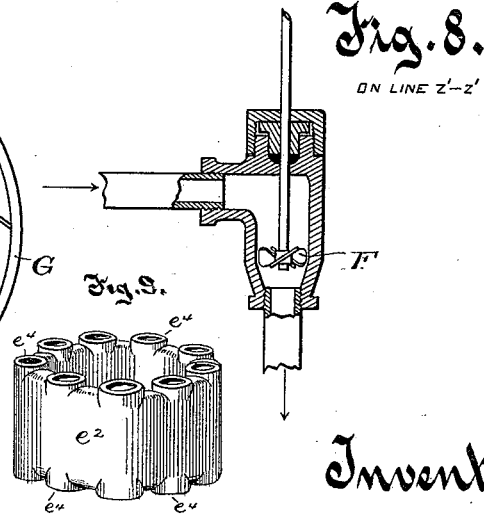
Witnesses.
N. A. Kennedy
Stanly Elmore
Inventor.
W. S. Johnson
By Phil T. Dodge
Attorney.

UNITED STATES PATENT OFFICE.

WARREN S. JOHNSON, OF MILWAUKEE, WISCONSIN.

WATER-HEATING APPARATUS.

SPECIFICATION forming part of Letters Patent No. 434,111, dated August 12, 1890.

Application filed November 13, 1888. Serial No. 290,736. (No model.)

*To all whom it may concern:*

Be it known that I, WARREN S. JOHNSON, of Milwaukee, in the county of Milwaukee and State of Wisconsin, have invented certain Improvements in Water-Heating Apparatus, of which the following is a specification.

My invention relates to a hot-water heating system in which the water flowing through the circulating-pipes is heated at one end of the system by means of steam; and the invention consists in certain improved details of construction hereinafter described, and pointed out in the claims.

The object of the invention is to provide for the effective and economical application of steam heat to the water, to insure the constant circulation of the water, and to provide for the direct heating of the water by means of a fire in the event of a failure of the steam-supply.

My system is applicable to house-heating, to the heating of railway-cars, and to other purposes. For the purposes of illustration I have shown the same applied to a railway-car. When thus applied, the steam may be received either from the boiler of the locomotive, a special boiler on the train, or stationary boilers located at intervals along the line of the road.

In the accompanying drawings, Figure 1 is a side elevation of a heater constructed on my plan, the device for controlling the circulation of the water being shown in vertical central section. Fig. 2 is an elevation of the heater with portions shown in vertical central section. Fig. 3 is a horizontal section on the line $x$ $x$ of Fig. 2, looking in a downward direction. Fig. 4 is a top plan view of the internal heating-cylinder with portions broken away to show its construction. Fig. 5 is a vertical section of the water-circulating devices on the line $y$ $y$ of Fig. 1. Fig. 6 is a sectional elevation through one end of a railway-car having my apparatus therein. Fig. 7 is a horizontal section on the line $z$ $z$ of Fig. 6, showing the wind-engine, by which the circulating device is operated. Fig. 8 is a vertical central section on the line $z'$ $z'$, Fig. 6. Fig. 9 is a view showing in perspective a part of one of the water rings or sections.

Referring to Fig. 6, A represents the body of an ordinary railway-car, B my improved heater or furnace, and C a series of water-circulating and radiating pipes extending from the heater throughout the car in any ordinary or approved manner. The arrangement of these water circulating pipes is not of the essence of my invention. They may be arranged as circumstances require, and used either alone or in connection with suitable radiators of ordinary form, their sole purpose being to provide for the distribution of the water and the radiation of the heat therefrom as in other hot-water heating systems.

Referring to the details of the furnace or heater shown in Figs. 1 to 4, $a$ represents the the base or ash-pit supporting a central fire-grate $b$ and an external double jacket $c$ $c'$, which incloses the metal body or manifold E. This body in the form of an upright tube or hollow cylinder consists of a series of ring-like sections $e$, $e'$, $e^2$, and $e^3$, seated one upon another and fastened firmly together. On their proximate faces these rings or sections are formed with tubular necks or bosses $e^4$, which register, as shown, so as to permit a free circulation of the water vertically through the successive sections, except the one at the base.

Into the top of the base-section $e$, which is intended to receive steam and which has no communication with the interior of the other sections, are screwed vertical pipes $f$, extending upward through the other sections and their necks. These pipes are carried slightly above the top section, and have their upper ends closed by welding or otherwise to prevent the escape of steam. The projecting upper ends are also threaded externally to receive the cap-nuts $h$, which bear on the top section $e^3$ for the double purpose of closing the surrounding necks and of binding the sections tightly together, so as to prevent leakage through their communicating necks to the exterior.

To insure the tightness of the joints between the necks, packing-rings or gaskets $i$, of hard rubber or other suitable material, are introduced between the faces of the necks, as shown. The water-circulating pipes C are tapped at one end into the upper section $e^3$ and at the other end into the lower section $e'$, as shown in Fig. 2. The base-section $e$ is connected on one side with the steam-supply pipe $k$, leading to or adapted for connection with a steam-boiler. On the opposite side the section $e$ is connected to a pipe $k'$ for carrying away the steam or the water of condensation resulting therefrom.

When the apparatus is in operation, the circulating-pipes C and the interior of the sections $e'$ $e^2$ $e^3$ around the outside of the pipes $f$ are filled with water. Steam is then introduced through the pipe $k$ into the base-section, from which it ascends into and constantly fills the vertical pipes $f$. These pipes, passing through the upper sections and the water therein, expose a very large radiating-surface, in consequence of which the heat of the steam is rapidly communicated to the water. The best results are obtained when the pipes $f$ are constructed of copper, which is an excellent conductor of heat.

In order to insure the circulation of the water, I propose to introduce into the circulating system at any suitable point a device for forcibly advancing the water. I prefer to use for this purpose a rotary wheel having spiral or oblique blades similar to the blades of an ordinary screw-propeller, as represented at F, Figs. 1 and 8. This screw may be driven from any convenient source of power. When there is a constant supply of steam, I extend the shaft of the screw through the stuffing-box, as shown in Figs 1 and 5, into a chamber $m$, where it is provided with blades $n$. The chamber $m$ is connected with the steam-supply pipe in such manner that the steam flowing to the heater acts upon the blades $n$, compelling them to revolve, and thereby turn the screw. When the circulating system is an extensive one, requiring a rapid consumption of steam to heat the water, it is found that the movement of the steam is sufficiently rapid to insure the rotation of the blades $n$.

In place of the devices above described for turning the screw this shaft may be extended to the top of the car or building, as shown in Fig. 6, and there connected to an ordinary wind-engine or wind-wheel G, such as shown in Figs. 6 and 7, so that the movement of the external air or the movement of the wheel through the air will cause the rotation of the circulating-screw.

In the event of the failure or insufficiency of the steam-supply the water in the circulating system may be heated by means of a fire built within the body E upon the grate $b$. To this end the heater is provided with the usual smoke-pipe at the top and with the regulating-dampers $i$ and $j$ of the customary form, such as shown in the drawings, or of other suitable form. The products of combustion pass upward within the rings or water-sections, and also through the spaces between their necks to the exterior.

I am aware that heaters have been constructed in various forms with steam-radiating pipes extended into and through water-chambers, and also that pumps and other devices driven from external motors have been used to produce a positive circulation of water in heating apparatus, and I therefore lay claim only to the following:

1. In a water-heater, the base-ring with steam-pipes leading upward therefrom and closed at their upper ends, in combination with the series of annular water-rings with communicating necks, through which the steam-pipes pass, and the nuts applied to the pipes and holding the parts together, substantially as shown.

2. In combination, the fire-grate, the steam-ring encircling the same, the series of pipes extending vertically from said ring and closed at the top, and the series of water-rings arranged above the base-ring and provided with communicating necks, through which the pipes are loosely passed, whereby the pipes are inclosed wholly within the water-space, a central fire-chamber provided, the free circulation of the water permitted, and the heating of the water by steam provided for.

3. In a water-heater, the grate, the annular steam-ring at the base, and the vertical pipes rising therefrom, in combination with the series of water-rings inclosing said pipes, provided with communicating necks, and formed to leave openings for the passage of the products of combustion outward from the central chamber between the rings.

4. In a water-heater, the combination of a water-containing body, steam-circulating pipes extending therethrough, a water-circulating system, a water-propelling wheel therein, and a wheel for driving the same located in the steam-pipe, whereby the steam current is applied to operate the mechanical device for compelling the circulation of the water.

In testimony whereof I hereunto set my hand, this 25th day of October, 1888, in the presence of two attesting witnesses:

WARREN S. JOHNSON.

Witnesses:
E. W. CHUBB,
L. F. FISH.